United States Patent [19]

Röhm

[11] 4,230,327
[45] Oct. 28, 1980

[54] DRILL CHUCK

[76] Inventor: Günter H. Röhm, Heinrich-Röhm Str. 50, 7927 Sontheim, Fed. Rep. of Germany

[21] Appl. No.: 26,886

[22] Filed: Apr. 4, 1979

[30] Foreign Application Priority Data

Apr. 7, 1978 [DE] Fed. Rep. of Germany ....... 2815026
Apr. 26, 1978 [DE] Fed. Rep. of Germany ....... 2818247

[51] Int. Cl.³ ............................................. B23B 31/12
[52] U.S. Cl. ........................................ 279/61; 279/60
[58] Field of Search ................... 279/60, 61, 62, 63, 279/64, 65

[56] References Cited

U.S. PATENT DOCUMENTS

| 2,621,054 | 12/1952 | Kasmr | 279/61 |
| 2,931,660 | 4/1960 | Barwinkel | 279/65 X |
| 3,599,999 | 8/1971 | Schnizler et al. | 279/60 |

FOREIGN PATENT DOCUMENTS

| 7222008 | 6/1972 | Fed. Rep. of Germany | 279/60 |
| 2341642 | 3/1975 | Fed. Rep. of Germany | 279/60 |
| 2500298 | 7/1975 | Fed. Rep. of Germany | 279/63 |
| 823067 | 11/1959 | United Kingdom | 279/64 |

*Primary Examiner*—William R. Briggs
*Attorney, Agent, or Firm*—Karl F. Ross

[57] ABSTRACT

A drill chuck has a chuck body provided with jaws that are surrounded by a tightening sleeve which can be rotated on the body to tighten or loosen the jaws. This sleeve has an array of radially inwardly projecting sleeve teeth spaced above an annular surface on the body and normally bearing downwardly on top of similarly constituted teeth of a bearing ring bearing via balls on this bearing surface of the body. The bearing ring can be fitted underneath these teeth bayonet-fashion by passing its teeth through the gaps between the teeth of the sleeve and then rotating it. Thereafter a locking element having fingers engaging axially in the gaps between the teeth of the ring and the sleeve locks these two elements rotationally together.

10 Claims, 5 Drawing Figures

FIG. 4
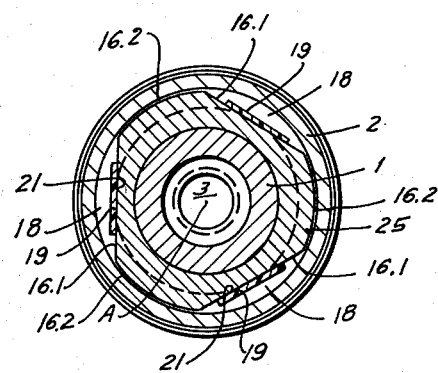
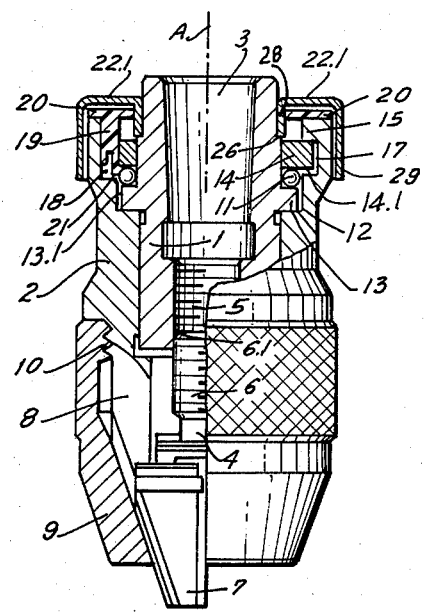
FIG. 5

DRILL CHUCK

FIELD OF THE INVENTION

The present invention relates to a drill chuck. More particularly this invention concerns such a chuck intended for heavy-duty use and which can be tightened by hand.

BACKGROUND OF THE INVENTION

A standard chuck is known, as for example from German utility model 7,222,008, having a chuck body defining a chuck axis and formed with an annular body surface centered on this axis, lying in a plane substantially perpendicular to the axis, and facing in one axial direction. A plurality of generally angularly equispaced and radially displaceable jaws are slidable in guides on this chuck body. A tightening sleeve is rotatable on the body about its axis and is effective to displace the jaws radially inwardly on rotation of this sleeve on the body in one rotational sense and for permitting radial outward displacement of the jaws on rotation in the opposite sense.

A bearing ring is normally threaded onto such a chuck body and has a bearing-ring surface that axially confronts and is spaced from the annular body surface. A plurality of roller elements is provided between and riding on the body and the ring surfaces to reduce friction between these two elements. It is standard practice to provide a radially extending setscrew on the bearing ring for preventing unscrewing of this bearing ring.

Such an arrangement requires that extremely careful tolerances be maintained during machining of the various surfaces and screw threads. The body and ring surfaces must be perfectly parallel to each other and perpendicular to the rotation axis of the chuck in order to prevent jamming of the roller elements. Furthermore it is not uncommon for the bearing ring to loosen, as during drilling forces effective between the chuck body and tightening sleeve normally have an angular component capable of unscrewing the bearing ring.

When the chuck described above is used for hammer drilling the first part to fail is normally the bearing. This type of failure is particularly common in self-tightening chucks such as described in my copending patent applications Ser. Nos. 011,772, 011,773 and 011,774 all filed Feb. 13, 1979.

OBJECTS OF THE INVENTION

It is therefore an object of the present invention to provide an improved chuck.

Another object is to provide a chuck, preferably of the self-tightening type, wherein the bearing will have a much longer service life, and which can be produced at substantially lower cost than the prior-art chucks.

SUMMARY OF THE INVENTION

These objects are attained according to the instant invention in a chuck provided with an array of radially extending teeth on the sleeve which are angularly spaced about the axis and define intertooth gaps. Each sleeve tooth has a surface generally parallel to, axially confronting, and axially spaced from the annular body surface. An array of radially extending ring teeth is provided on the ring and is similar to the array of sleeve teeth. Each ring tooth has one axially directed face engageable with the sleeve-tooth surfaces and another oppositely axially directed face confronting and axially spaced from the annular body surface. Roller elements ride between the body and ring surfaces. According to this invention, therefore, it is possible to fit the ring bayonet-fashion underneath the teeth of the sleeve. Thereafter a locking element is engaged through at least one of the intertooth gaps of the sleeve teeth and serves to hold the ring teeth in axial alignment with the sleeve teeth with their one set of faces bearing flatly on the sleeve-tooth surfaces. Thus this locking element prevents rotation of the ring relative to the sleeve.

With the system according to the instant invention it is therefore possible to support the bearing ring that engages the roller elements so that it is axially extremely solidly fixed, in fact in direct flat axial abutment against the sleeve teeth. As the angular force effective on this bearing ring is relatively slight, the locking element will be able to hold it tightly in place with a modest force, so that this locking element need not be extremely robustly built. At the same time machining of the various elements so that the face of the bearing ring lies perfectly perpendicular to the axis of the chuck and perfectly parallel to the surface of the body against which the rollers also ride is relatively easy. These surfaces can all be turned at the same time, and the necessity of exactly forming screw threads on the sleeve and on the bearing ring is eliminated.

According to this invention the teeth all have edges lying in respective planes parallel to but radially offset from the chuck axis. The teeth are angularly equispaced so that the bearing ring can be inserted in any of a plurality of positions, and then turned through an angular distance equal to the angular width of a single tooth to lock each of its teeth under a respective tooth of the sleeve, whereupon the locking element is fitted in to prevent further rotation. This locking element according to the instant invention is a locking ring formed with a plurality of fingers engaging axially through the gaps defined by the teeth, so that for each gap there is a finger preventing rotation of the bearing ring relative to the sleeve. The locking ring itself can be made of elastically deformable synthetic-resin material and each of the fingers can be hooked over the bearing ring to press it tightly against the sleeve teeth.

In accordance with another feature of this invention a holding ring is provided for axially securing the locking ring against axial displacement. This holding ring is secured to the chuck body. It may be a split ring whose split is spanned by a tightening screw for locking it to the chuck body. It is also possible for this holding ring to be formed of sheet metal with axially extending inner and outer collars, the inner collar being force-fitted around the chuck body and the outer collar reaching down around the sleeve.

The provision of elastic locking elements pressing the bearing ring against the sleeve teeth ensures that during loosening of the chuck, when forces normally urge apart the surfaces engaging the roller elements, accidental shifting of this bearing ring is impossible. Holding the two elements tightly together prevents any foreign matter from entering between the engaging surfaces of the sleeve teeth and of the bearing ring so that canting of the bearing ring in the chuck due to lodging of foreign matter between it and the sleeve teeth is ruled out.

BRIEF DESCRIPTION OF THE DRAWING

FIGS. 2, 3 and 4 are cross sections taken along lines II—II, III—III, and IV—IV, respectively, of FIG. 1; and FIG. 5 is a view similar to FIG. 1 showing a variation of the chuck according to this invention.

SPECIFIC DESCRIPTION

Figure 1:
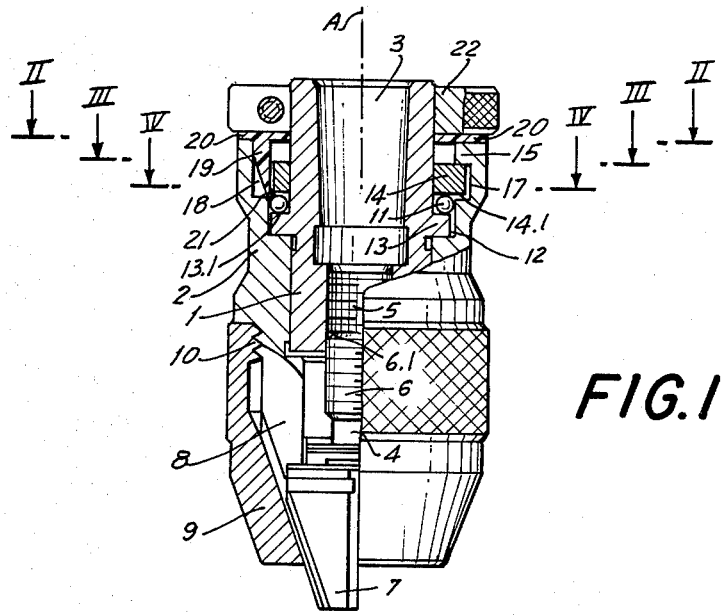
FIG. 1 is a side partly sectional view of a chuck according to this invention.

A chuck according to this invention has a central chuck body 1 surrounded by a tightening sleeve 2 and formed with an axially open hole or bore 3 adapted to receive the stem of a drill for rotation of the body 1 about its central axis A. A pusher 4 in this body has a stem 6 formed with a screw thread 6.1 which is received in a threaded axial bore 5 of the body 1 and is rotationally connected to and bears axially on the rear ends of three jaws 7. The body 1 has an end part 9 threaded at 10 to itself and formed with three inclined guide grooves 8 each receiving a respective jaw 7. Rotation of the sleeve 2, therefore, relative to the body 1 will axially and radially displace the jaws 7 in the manner described in more detail in my copending applications Ser. Nos. 011,773, 011,772, and 011,774 all filed Feb. 13, 1979.

The body 1 is formed with a radially outwardly projecting square-section ridge 13 bearing axially in one direction on a shoulder 12 of the sleeve 2. In the opposite direction this ridge 13 has an annular body surface 13.1 lying in a plane perpendicular to the axis A and bearing via balls 11 and a ring 14 on three angularly equispaced teeth 15 formed on the sleeve 2.

Figure 2:
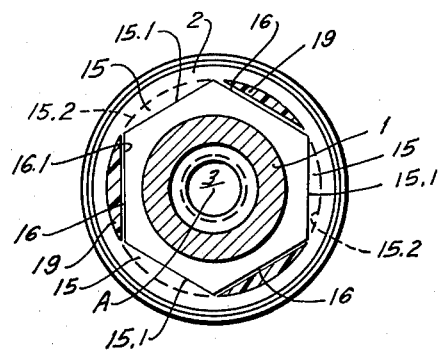
Figure 3:
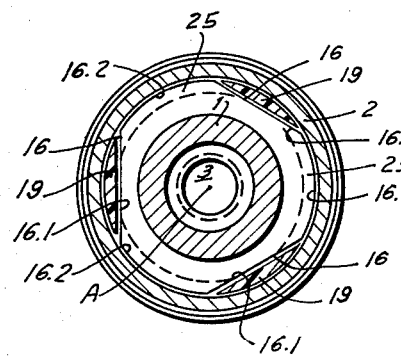

As best shown in FIGS. 2–4 each of the teeth 15 has an inner face 15.1 lying on a plane parallel to but spaced from the axis A and joins the cylindrical sleeve 2 at a cylindrical outer edge 15.2 having a center of curvature at the axis A.

The ring 14 is formed on its periphery with recesses 16 of complementary shape to the teeth 15, that is having chordal surfaces 16.1 and arcuate bounding edges 16.2. Thus the ring 14 has three outwardly extending teeth 25. The ring 14 can thus move axially past the teeth 15 when it gaps or recesses are aligned with these teeth 15, so that the ring 14 can enter the space 17 between the lower surfaces of the teeth 15 and the surface 13.1. When in this space 17 the ring 14 can be rotated to bring its teeth 25 into alignment underneath the teeth 15, thereby axially locking the ring 14 under the teeth 15 so that the rollers 11 will bear on the surfaces 13.1 and 14.1 of the ridge 13 and ring 14.

According to this invention a locking element has a ring 20 from which three angularly equispaced fingers 19 depend into the spaces or gaps 18 defined by the spaces between the teeth 15 and 25. In addition each of these fingers 19 has a bent-in tip 21 that engages elastically under the ring 14 and pulls it up against the lower surfaces of the teeth 15. To this end the ring 20 and its fingers 19 are unitarily formed of a resilient synthetic resin such as a polyamide.

The ring 20 is in turn held in place by another ring 22 split at 23 and locked on the upper end of the body 1 by means of a bolt 24 spanning the split 23. In this manner the entire assembly is locked tightly together, yet relative rotation of the parts 1 and 2 is entirely possible with the principal forces between these elements being passed through the rollers 11. As the ring 14 is securely held under the teeth 15 and prevented from rotating by the locking element 19, 20 the chuck can withstand enormous stresses, as for instance encountered in a hammer drill.

FIG. 5 shows an arrangement wherein the same reference numerals employed in FIG. 1 are used for identical structure. Here, however, the ring 22 is replaced by a sheet-metal ring 22.1 lying in a plane perpendicular to the axis A and having an inner bent-down lip or periphery 28 force-fitted over the upper end of the body 1 and resting against a shoulder 26 thereof. It furthermore has an outer periphery or rim 29 spaced slightly outwardly from and extending axially down around the upper end of the sleeve 2. As virtually no axial force is effective on the holding element 19, 20 this force-fitted ring 22.1 is altogether sufficient to hold the device firmly together. The use of bent-down cylindrical rims 28 and 29 further ensures that considerable rigidity will be imparted to the ring 22.1.

I claim:

1. A chuck comprising:
    a chuck body defining a chuck axis and formed with an annular body surface centered on said axis, lying in a plane substantially perpendicular to said axis, and facing in one axial direction;
    a plurality of generally angularly equispaced and radially displaceable jaws on said body;
    a tightening sleeve rotatable on said body about said axis;
    means including formations on said jaws, on said body, and on said sleeve for displacing said jaws radially inwardly on rotation of said sleeve on said body in one rotational sense and for permitting radial outward displacement of said jaws on rotation in the opposite sense;
    an array of radially extending sleeve teeth on said sleeve angularly spaced about said axis and defining intertooth gaps, each sleeve tooth having a sleeve-tooth surface generally parallel to, axially confronting, and axially spaced from said annular body surface;
    a bearing ring centered on said axis and received between said sleeve teeth and said annular body surface, said ring being at least limitedly rotatable about said axis relative to said sleeve and having a ring surface axially confronting and spaced from said annular body surface;
    an array of radially extending ring teeth on said ring and similar to said array of sleeve teeth, each ring tooth having one axially directed face engageable with said sleeve-tooth surfaces and another oppositely axially directed face confronting and axially spaced from said annular body surface;
    a plurality of roller elements between and riding on said body and ring surfaces; and
    a locking element engaging through at least one of said intertooth gaps and holding said ring teeth in axial alignment with said sleeve teeth with said one faces of said ring teeth bearing flatly on said sleeve-tooth surfaces, whereby said locking element prevents rotation of said ring relative to said sleeve.

2. The chuck defined in claim 1 wherein each of said teeth has an edge lying substantially in a plane generally parallel to and offset from said axis.

3. The chuck defined in claim 1 wherein said locking element is elastic and elastically biases said one faces of said ring teeth against said sleeve-tooth surfaces.

4. The chuck defined in claim 3 wherein said locking element is a ring having a plurality of fingers extending axially through said gaps.

5. The chuck defined in claim 4, further comprising a holding ring fixed to said body and bearing axially in said one direction on said ring of said locking element.

6. The chuck defined in claim 5 wherein said holding ring is a split ring and is provided with a chordal tightening screw.

7. The chuck defined in claim 5 wherein said holding ring lies in a plane substantially perpendicular to said axis and has an inner generally cylindrical collar fitted tightly around said body and extending toward said bearing ring.

8. The chuck defined in claim 7 wherein said inner collar is force-fitted to said body.

9. The chuck defined in claim 5 wherein said holding ring lies in a plane substantially perpendicular to said axis and has an outer generally cylindrical collar extending in said one direction around said sleeve.

10. The chuck defined in claim 9 wherein said holding ring has an inner generally cylindrical collar force-fitted around said body and extending toward said bearing ring, said holding ring and collars being unitarily formed of sheet metal.

* * * * *